2,867,529

PROCESS FOR RECOVERING PRECIOUS METALS FROM REFRACTORY MINERALS

Frank A. Forward and Wei Cheng Lin, Vancouver, British Columbia, Canada, assignors to Sherritt Gordon Mines Limited, Toronto, Ontario, Canada, a company of the Province of Ontario No Drawing. Application August 5, 1957
Serial No. 676,376

5 Claims. (Cl. 75—118)

This invention relates to a process for the treatment of refractory ores and concentrates for the ultimate recovery of precious metals, such as gold and silver. The invention is particularly directed to providing a method for the treatment of refractory ores and concentrates which contain at least one precious metal, sulphur, and at least one compound of an element of the group consisting of arsenic, antimony and lead.

Processes for the recovery of precious metals from ores and concentrates by cyanidation are well known and are widely used, particularly in the recovery of gold. It is known, also, that it is very difficult, if not impossible, to obtain a high recovery of precious metals by direct cyanidation of refractory ores and concentrates. That is, they contain compounds of metal or metalloid elements such as sulphur, lead, arsenic and antimony. It is found that such ores must be given a preliminary treatment to convert them into a form in which they are amenable to cyanidation.

The presence of sulphur, usually as a sulphide, alone does not present any particular difficulty from a technical view point but it may present operating problems. It can be removed by an oxidizing roasting operation but such an operation must be conducted at a relatively low temperature, safely below that at which there would tend to be fusion or incipient fusion of mineral particles which would prevent free access of the cyanide solution to the precious metal values locked in the particles. Thus, while sulphur can be eliminated by roasting, it is not an entirely satisfactory method.

It is known that the arsenic content of an ore or concentrate can be reduced by a low temperature roasting operation. However, elements such as lead and antimony contained in an ore or concentrate tend to form, during roasting, low melting temperature oxidized compounds which fuse into glass-like particles. These particles occlude precious metals and it is extremely difficult, if not impossible, to recover the precious metals from them.

We have found that the problem of extracting precious metals from refractory ores and concentrates by cyanidation can be overcome by subjecting the refractory material to a preliminary roasting operation in an atmosphere deficient in oxygen followed by oxidation in an aqueous acid solution, and thereafter recovering the precious metal values from the undissolved, oxidized residue from the acid oxidation treatment.

The process of the present invention comprises, in general, the steps of roasting a refractory metal bearing material which contains precious metal values, sulphur and at least one metal or metalloid compound of the group consisting of lead, arsenic and antimony in comminuted state in a non-oxidizing atmosphere and at a temperature above about 900° F. but below the fusion temperature of the particles to remove at least part of at least one member of the group consisting of arsenic and antimony by distillation, removing treated metal bearing particles from the roasting step and dispersing them in an aqueous medium of the group consisting of water and aqueous acid sulphate solution to form a slurry, agitating and reacting the slurry with a free oxygen bearing gas at a temperature within the range of from about 200° F. to about 375° F. and under a partial pressure of oxygen above about 10 pounds per square inch to convert at least a portion of the sulphur contained in the metal bearing material to elemental sulphur in the form of liquid sulphur globules with occluded metal bearing particles, converting liquid sulphur globules to solid sulphur pellets, separating solid sulphur pellets from the slurry, re-cycling sulphur pellets and occluded metal bearing material to the roasting step of the method, and recovering precious metals from the undissolved, oxidized residue from the slurry.

The efficient recovery of precious metals contained in refractory ores and concentrates heretofore has been a difficult problem. Such ores usually contain arsenopyrite and varying amounts of antimony and lead minerals. Ores in which pyrite is the only sulphide mineral usually can be converted to oxides by roasting in an oxidizing atmosphere and converted to a porous form which permits extraction and recovery of the contained precious metal values by cyanidation. However, when the ore contains arsenic there is tendency, during conventional oxidation processes, to form insoluble arsenates which may occlude precious metal values. Particularly, if the ore or concentrate contains lead or antimony, even in small amounts, there is a strong tendency for the latter to form low melting temperature oxides which combine with other particles, for example, iron and silica, to form glass-like products which occlude precious metal values. It is very difficult, if not impossible, to obtain a high precious metal recovery by conventional roasting and cyanidation methods from such refractory materials.

The preliminary roasting step of the present invention is conducted in an atmosphere deficient in oxygen, under conditions described in detail hereinafter, for a period of time sufficient to remove at least a part of the arsenic and sulphur by distillation, and to convert the pyritic minerals present into the form of pyrrhotite, which is amenable to treatment by the low temperature acid oxidation step which follows the roasting step with concurrent formation of elemental sulphur agglomerates which function as a collector for metal bearing particles which are wettable by molten elemental sulphur.

The conditions under which the roasting step is conducted are determined by the characteristics and the constitution of the refractory ore or concentrate. Primarily, the roasting operation is conducted in a substantially non-oxidizing atmosphere, such as in an inert atmosphere or in an atmosphere deficient in oxygen, and at a temperature at which distillation proceeds with reasonable rapidity but safely below that at which there would be fusion or incipient fusion of the particles. In general, the roasting step is conducted at a temperature within the range of from about 900° F. to 1500° F. The operation usually requires from one-half to two hours but the time can be increased or reduced to meet the requirements of the specific material being treated.

The decomposed ore or concentrate from the roasting step is cooled to a temperature below about 100° C. out of contact with air. This can be effected by quenching with water or a weak acid or by passing it through a conventional cooling device. After cooling, this material is passed to the acid oxidation step.

The charge to the acid oxidation step comprises pyrrhotite, undecomposed arsenopyrite, pyrite, antimony and lead minerals, and precious metals such as gold and may include decomposed chalcopyrite and pentlandite and gangue material such as barren silicates.

The size of the particles of pyrrhotitic material subjected to acid oxidation in this step can vary over a wide range. For example, material from a preliminary concentrating step is usually of the order of from 100 to 325 mesh standard Tyler screen. This requires no further grinding. Particles larger than about 35 mesh should be ground to within the range of from about 35 mesh to about 325 mesh. As a general rule, the finer the particle size the faster is the rate of oxidation to obtain maximum oxidation of the refractory minerals.

The particles of the ore or concentrate from the roasting step are dispersed in an aqueous solution to form a slurry. The aqueous slurry forming medium can be water, or a dilute sulphuric acid solution, or re-cycle solution from the step in which undissolved, oxidized material is separated from the slurry. The oxidation reaction can be represented by the following equation:

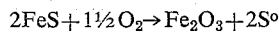
$$2FeS + 1\tfrac{1}{2}O_2 \rightarrow Fe_2O_3 + 2S°$$

The starting solution can be water, or water to which a small amount of acid, for example about 1 to 10 grams per litre or more of sulphuric acid, has been added to initiate the reaction more rapidly. It may be necessary to add larger amounts of acid to counteract the neutralizing action of acid consuming constituents in the refractory material.

Having regard to the acid concentration of the slurry, the pulp density, or the ratio of solids to solution, also can be varied within relatively wide limits. The slurry is agitated actively during the course of the oxidation reaction and the maximum density is that at which the solids can be retained as a dispersion in the solution. It is possible to operate the oxidation step at a maximum pulp density of from about 40 to 50% solids but the best results insofar as the rate and the extent of oxidation appear to be obtained within the range of from about 20 to 30% solids.

The temperature at which the oxidation reaction is conducted is within the lowest temperature at which oxidation of sulphides proceeds at an economically practical rate and the upper temperature at which sulphide sulphur converts principally to sulphate sulphur.

The acid oxidation step can be conducted at a temperature above about 400° F. In this case, the sulphide sulphur in the sulphide minerals is oxidized to sulphate sulphur and the product will be in the form of porous particles from which precious metal values can be recovered. However, as the sulphur present in the ore or concentrate is converted to sulphate form, it must be neutralized thus requiring the use of large amounts of neutralizing agent such as lime or limestone. It is a feature of this invention that the acid oxidation step is conducted at a temperature at which sulphide sulphur is oxidized to elemental sulphur which can be separated from this step as pellets. Also, particles which are wettable by sulphur are collected by and occluded in elemental sulphur particles from which they can be separated in the manner described hereinafter. The wettability of the metal bearing particles of the charge treated by the aqueous oxidation step of this process is the extent to which the solids are wetted by molten elemental sulphur measured by the force of adhesion between the solid and the liquid phase. Pyrrhotite particles rapidly oxidize to ferric oxide and elemental sulphur and the resulting ferric oxide particles are not wetted by the sulphur. Free gold or gold associated with the pyrrhotite also does not appear to be wetted by the sulphur. A film of lead sulphate appears to form on lead sulphide particles which also do not appear to be wetted by the sulphur. Thus, ferric oxide, gold associated with the pyrrhotite and lead thus report in the residue. Other minerals, such as undecomposed pyrite, which does not decompose readily in the heating step, are wettable by sulphur and particles thereof are occluded in elemental sulphur particles. Precious metal values, such as gold, may be, and usually are, locked in such wettable particles and are not recoverable therefrom, at least with a satisfactory efficiency, by cyanidation. Thus, as oxidation proceeds, sulphur wettable particles are collected by and occluded in elemental liquid sulphur globules and are retained in the globules as they are solidified into pellets. Sulphur pellets and occluded sulphur wettable particles are separated from the slurry and are re-cycled to the heating step described above with or without preliminary drying and/or grinding.

The residue, which comprises essentially the oxidized fraction of the charge to the aqueous oxidation step and associated precious metal values, is then treated for the recovery of precious metals such as by cyanidation.

A very satisfactory temperature range for the aqueous oxidation step appears to be from about 200° F. to about 375° F. At a temperature below about 200° F., the reaction appears to be too slow for a commercially practical operation, and the formation of sulphur pebbles appears to cease at about 375° F. Corrosion of conventional stainless steel equipment begins to be an important factor at temperatures above about 300° F. Therefore, it is preferred to operate at a temperature within the range of from about 200° to about 300° F., within which temperature range stainless steel equipment can be employed without appreciable corrosion. If the oxidation reaction is conducted at a temperature below the melting temperature of sulphur, the elemental sulphur is formed in relatively small particles. These particles can be agglomerated into liquid sulphur globules by increasing the temperature of the slurry to above the melting temperature of sulphur. During the agglomeration of elemental sulphur into liquid sulphur globules, unoxidized particles become attached to or occluded in the liquid sulphur globules. The slurry can then be cooled to below the melting temperature to solidify the globules into pellets. If the oxidation reaction is conducted at a temperature above the melting temperature of sulphur, the elemental sulphur forms liquid globules or agglomerates with attendant occlusion of wettable particles. After completion of the oxidation, the temperature of the slurry is reduced to below the melting temperature of sulphur to solidify the globules.

The pressure at which the aqueous oxidation reaction is conducted also appears to be a matter of choice, having regard to all the factors which must be taken into consideration, such as the capital and operating costs of the equipment employed, the rate of oxidation desired, and the rate of production within a prescribed period of time, and the nature of the oxidizing gas employed. As a general rule, operation under a partial pressure of oxygen below about 10 pounds per square inch is too slow for a commercially practical operation. Operation under partial pressures of oxygen above about 100 pounds per square inch involves the use of high pressure equipment if air is employed as the oxidizing gas. Therefore, it is preferred to operate the process under a partial pressure of oxygen within the range of from about 10 to about 100 pounds per square inch.

Sulphur pellets with occluded wettable mineral particles are separated from the slurry, such as by screening, or by gravity methods of separation. These pellets are re-cycled to the roasting step with or without preliminary grinding. As the preliminary roasting step is conducted at a temperature above the boiling temperature of sulphur, sulphur is separated from the pellets as sulphur vapour. The re-cycled unoxidized or partially oxidized particles are then returned to the acid oxidation step. This procedure has the important advantage of maintaining a non-oxidizing or even a slightly reducing atmosphere during roasting. That is, it may be necessary to supply some oxygen to provide the heat necessary for the operation, for example, for the combustion of oil or gas. Also, there may be some leakage of air into the roasting apparatus. Sulphur vapour released from the re-cycled pellets combines with oxygen present in the apparatus and thus maintains the desired inert or slightly reducing atmosphere in the roasting apparatus. Sulphur pellets can be ground, if desired, to a finer particle size prior to re-cycling them to the roasting step.

In the operation of the aqueous oxidation step, pyrrhotite reacts with oxygen to produce mainly elemental sulphur and insoluble iron oxide and relatively small amounts of ferrous sulphate, ferric sulphate and sulphuric acid. Arsenical minerals, antimony minerals, and lead minerals react with oxygen to produce insoluble arsenates and antimonates and lead sulphate. Non-ferrous metal minerals such as those containing nickel, copper, cobalt and zinc are at least partially oxidized to soluble sulphates. Pyrite, if present, arsenopyrite and antimony and lead sulphide minerals which have not been decomposed in the roasting step may not be affected by the acid oxidation in which case they are collected by the liquid elemental sulphur globules and returned to the roasting step for further treatment in that step. Sulphur wetted particles occluded in the sulphur pellets may contain a substantial percentage of the precious metals content of the original charge.

The following examples illustrate the operation of the process of this invention.

Portions of a refractory gold concentrate which comprised principally of arsenopyrite and pyrite with some antimony and lead were subjected to a preliminary roasting operation at from 1200° F. to 1600° F. and then cyanided, which is a more or less conventional sequence of procedures with refractory ores or concentrates which contain precious metals. A portion of each roasted concentrate (a) was cyanided directly without grinding the calcine and a portion (b) of the calcine was ground to less than 200 mesh before cyaniding. The gold recoveries obtained in cyaniding the unground (a) and ground (b) fractions of the respective concentrates are illustrated in Table I.

Table I

|  | #1 Low (0.5%) Sb | | #2 High (2.5%) Sb | | #3 Low Sb |
| --- | --- | --- | --- | --- | --- |
|  | a | b | a | b | a |
| Oz./ton: | | | | | |
| Au in head | 5.10 | 5.10 | 6.72 | 6.72 | 8.71 |
| Au in tail | 2.04 | 0.64 | 5.44 | 2.9 | 4.32 |
| Au recovery, percent | 60.0 | 87.5 | 19.1 | 56.9 | 50.4 |

From the experiments in pre-roasting following grinding and cyaniding, a maximum gold recovery of about 87.5% can be expected from a low antimony concentrate and from 50 to about 60% from a high antimony concentrate.

The respective concentrates were then subjected, without preliminary treatment to convert pyrite to pyrrhotite, to an acid oxidation treatment prior to the cyaniding step. The oxidation conditions and the gold recoveries obtained are illustrated in the following Table II.

91.8% from a concentrate oxidized 16 hours at 300° F. and 97.2% and 98.6% recoveries after oxidation for 1 hour at 445° F. However, it is found that a high lime consumption, of the order of from 700 to 850 pounds per ton of concentrate, is required to neutralize the pulp prior to cyaniding. A further disadvantage is that oxidation must be conducted at a temperature of from 400° to 450° F. to obtain a satisfactory rate of oxidation and the total pressure, autogenous and the partial pressure of oxygen, within that temperature range is high, of the order of from 500 to 1000 pounds per square inch, thus necessitating the use of costly high pressure, corrosion resistant equipment.

A further high temperature acid oxidation test, without preliminary treatment, was conducted on a gold concentrate which contained 24.1% Fe; 24.3% S; 8.5% As; 6.6 oz. per ton Au; and 5.3 oz. per ton Ag. This concentrate was dispersed in water to form a slurry and the slurry was heated in an autoclave to and maintained at a temperature within the range of from 450° to 475° F. under a total pressure of about 700 pounds per square inch by feeding air into the autoclave. The oxidation treatment was continued for about two hours. At the end of this period, from 49% to 59% of the iron, from 77% to 86% of the sulphur, from 16% to 23% of the arsenic, 0.1% of the gold and from 2% to 5% of the silver dissolved in the solution which had an acid, $H_2SO_4$, concentration of about 8%. The residue was well oxidized and appeared to be in the form of $FeOHSO_4 \cdot FeAsO_4$ compounds. The solution was neutralized with limestone ($CaCO_3$) and the residue, after separation from the solution, was subjected to conventional cyaniding. From 97% to 98% of the gold and about 95% of the silver originally contained in the concentrate were recovered from the residue. The consumption of cyanide was from 2.5 to 7.5 pounds per ton of concentrate. About 1300 pounds of 94% $CaCO_3$ was required per ton of concentrate for these purposes.

We have found that provided the sulphide sulphur content of the ore or concentrate is in the form of pyrrhotite, the aqueous acid oxidation treatment can be conducted with relatively short periods of time and at a temperature at which conventional low pressure, stainless equipment can be used with important savings in the amount of alkali required to neutralize the free acid content of the slurry prior to cyanidation.

The following Table III illustrates the results obtained by subjecting a high antimony gold concentrate of the type described above to aqueous acid oxidation after a preliminary roasting operation in a non-oxidizing atmosphere during which at least part of the arsenic content was distilled off and at least part of the pyrite was converted to pyrrhotite. The acid oxidation treatment was conducted at a temperature within the range of from 225° F. to 300° F. for one hour. In treating these particular concentrates, sulphur pebbles were formed when the oxidation was conducted at a temperature as high as 375° F. However, it was found having regard to all Table II

| Experiment number | A-4 | B-9 | C-5 | D-1 | E-2 | F-3 |
| --- | --- | --- | --- | --- | --- | --- |
| Material used | Low Sb (0.5%) concentrate | | | High Sb (2.5%) concentrate | | |
| Temperature of oxidation °F | 300 | 300 | 300 | 390 | 445 | 445 |
| Duration of oxidation hr | 6 | 10 | 16 | 1 | 1 | 1½ |
| Cyanidation results: | | | | | | |
| Au in head oz./t | 6.10 | 5.00 | 4.50 | 5.24 | 5.72 | 5.44 |
| Au in tail oz./t | 1.90 | 1.35 | 0.37 | 2.54 | 0.16 | 0.08 |
| Au recovery percent | 69.0 | 73.0 | 91.8 | 51.5 | 97.2 | 98.6 |

This Table II illustrates that the concentrates can be subjected, without preliminary treatment, to acid oxidation at temperatures from about 300° to 450° F. with good gold recoveries in the following cyaniding step, the factors which must be considered in the development of a commercially practical process, that optimum results were obtained within the range of from 225° to 300° F.

Table III.—Experiments with the re-cycling of pebbles

| Experiment number | L (1-5) | P (1-9) | P (10-17) |
|---|---|---|---|
| Concentrate used | Low Sb (0.5%) centrate (Au=6.45 oz./t.) | High Sb (2.5%) concentrate (Au=5.22 oz./t.) | |
| Heating temperature °F | 1,100 | 1,400 | 1,100 |
| Cyanidation results: | | | |
| Ave. Au in head oz./t | 2.20 | 5.85 | 3.56 |
| Ave. Au in tail oz./t | 0.13 | 0.52 | 0.18 |
| Ave. Au recovery percent | 94.0 | 91.1 | 95.0 |
| Au assays in the successive samples of calcines (to show the presence or absence of Au) | L-1 8.00<br>L-2 13.76<br>L-3 16.22<br>L-4 20.12<br>L-5 22.20 | P-1 6.24<br>P-2 7.36<br>P-3 7.72<br>P-4 8.26<br>P-5 7.66<br>P-6 7.96<br>P-7 7.44<br>P-8 7.74<br>P-9 7.50 | P-10 7.66<br>P-11 9.04<br>P-12 10.38<br>P-13 11.04<br>P-14 11.90<br>P-15 12.50<br>P-16 12.40<br>P-17 13.62 |

If the amount of sulphur pellets re-cycled to the roasting step tends to increase as the operation of the roasting and oxidation steps are conducted, such as on a continuous basis, a part can be treated separately, such as by burning, and the metal bearing fraction can be passed to the roasting step or the aqueous oxidation step to reduce the circulating load of sulphur pellets.

A further modification of the invention is of interest if the plant in which the metal bearing material is treated is remote from a source of sulphuric acid. The sulphide ore or concentrate can be subjected to a preliminary oxidizing roast to produce a sulphur dioxide containing combustion gas and the gas or the sulphur dioxide content thereof bubbled through water which absorbs sulphur dioxide. This $SO_2$ containing solution can then be reacted under a partial pressure of oxygen to form sulphuric acid solution suitable for use in the oxidation step. As a specific example of this procedure, sulphur dioxide was bubbled through water to produce a solution which contained 60 g. p. l. sulphur dioxide. This solution was reacted for 30 minutes at 230° F. with a free oxygen bearing gas at a partial pressure of oxygen of 20 pounds per square inch. The resulting solution contained 93 g. p. l. sulphuric acid.

It is necessary to neutralize the oxidized product of the acid oxidation step preparatory to cyaniding. Also, if the acid solution is to be discarded it may present a disposal problem and should be neutralized before being discharged to waste. In the treatment of the concentrates described herein a lime consumption of about 120 pounds per ton of concentrates was required to neutralize both the oxidized residue and solution. From 50 to 80 pounds of lime per ton of concentrate were required when only the oxidized residue was neutralized and the solution was re-cycled. Thus, there is an important saving in lime consumption as well as in sulphuric acid consumption by re-cycling the solution.

The cyaniding step was conducted according to conventional practice. Neutralized oxidized residue was mixed with water, about 50% solids, and ground in a ball mill. The slurry was then reacted with cyanide, NaCN, in the ratio of about 5 pounds per ton of concentrate, with a small amount of added lime, in the ratio of about 26 pounds of lime per ton of residue, and agitated for a period of from 24 to 48 hours depending on the gold content of the material treated.

The process of the present invention possesses a number of important advantages. Refractory mineral sulphide ores and concentrates which contain precious metals can be converted to a form in which they are amenable to the extraction of the precious metals therefrom in conventional precious metal recovery processes. The aqueous oxidation step is conducted under relatively low temperature and pressure conditions which permit the use of conventional low pressure stainless steel equipment. A further advantage is that the acid oxidation step can be conducted as a continuous process. A further important advantage is the relatively small amount of reagent necessary to neutralize the decomposed minerals prior to cyaniding and the relatively small amount of acid necessary for the continuous operation of the leaching step. A further important advantage is, of course, that the recovery of precious metals from such refractory mineral sulphides is substantially increased over that which can be obtained by conventional procedures.

What we claim as new and desire to protect by Letters Patent of the United States is:

1. The method of treating a refractory, metal bearing material which contains sulphur, at least one precious metal, and at least one metal or metalloid compound of the group consisting of lead, arsenic and antimony, which comprises roasting the metal bearing material in comminuted state in a non-oxidizing atmosphere and at a temperature above about 900° F. but below the fusion temperature of the particles to remove at least part of at least one member of the group consisting of arsenic and antimony by distillation, removing treated metal bearing particles from the roasting step and dispersing them in an aqueous medium of the group consisting of water and aqueous acid sulphate solution to form a slurry, agitating and reacting the slurry with a free oxygen bearing gas at a temperature within the range of from about 200° F. to about 375° F. and under a partial pressure of oxygen above about 10 pounds per square inch to convert at least a portion of the sulphur contained in the metal bearing material to elemental sulphur in the form of liquid sulphur globules with occluded metal bearing particles, converting liquid sulphur globules to solid sulphur pellets, separating solid sulphur pellets from the slurry, re-cycling sulphur pellets and occluded metal bearing material to the roasting step of the method, and recovering precious metals from the undissolved, oxidized residue from the slurry.

2. The method of treating a refractory metal bearing material according to claim 1 characterized in that the roasting step is conducted at a temperature within the range of from about 900° F. to about 1500° F.

3. The method of treating a refractory metal bearing material according to claim 1 characterized in that a portion of the sulphur pellets produced in the acid oxidation step is re-cycled to the roasting step and a portion is treated separately for the separation therefrom of occluded metal values.

4. The method of treating a refractory metal bearing material according to claim 1 characterized in that the roasting step is conducted in an atmosphere deficient in oxygen and which includes sulphur vapour.

5. The method of treating refractory, metal bearing material which contains pyritic mineral sulphides, at least one precious metal, and at least one compound of a metal selected from the group consisting of lead, arsenic and antimony, which comprises roasting the metal bearing material in comminuted state in a non-oxidizing atmosphere and at a temperature above about 900° F. but below the fusion temperature of the particles to convert at least part of the pyritic mineral sulphides to pyrrhotite and to remove at least part of at least one compound of a metal of the group consisting of arsenic and antimony by distillation, removing treated metal bearing particles from the roasting step and dispersing them in an aqueous medium of the group consisting of water and aqueous acid sulphate solution to form a slurry, agitating and reacting the slurry with a free oxygen bearing gas at a temperature within the range of from about 200° F. to about 375° F. and under a partial pressure of oxygen above about 10 pounds per square inch to convert at least a portion of the sulphur contained in the metal bearing material to elemental sulphur in the form of liquid sulphur globules with occluded metal bearing particles, converting liquid sulphur globules to solid sulphur pellets, separating solid sulphur pellets from the slurry, re-cycling sulphur pellets and occluded metal bearing material to the roasting step of the method, and recovering precious metals from the undissolved, oxidized residue from the slurry.

References Cited in the file of this patent

UNITED STATES PATENTS 2,065,547    Arnold et al. _____ Dec. 29, 1936